United States Patent
Gupta et al.

(10) Patent No.: US 12,141,355 B1
(45) Date of Patent: *Nov. 12, 2024

(54) SPATIALLY OFFSET HAPTIC FEEDBACK

(71) Applicant: Meta Platforms Technologies, LLC, Menlo Park, CA (US)

(72) Inventors: Aakar Gupta, Redmond, WA (US); Majed Jamal Samad, Redmond, WA (US); Hrvoje Benko, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,460

(22) Filed: Jul. 5, 2023

Related U.S. Application Data

(63) Continuation of application No. 17/470,564, filed on Sep. 9, 2021, now Pat. No. 11,720,175, which is a continuation of application No. 16/847,327, filed on Apr. 13, 2020, now Pat. No. 11,132,058.

(60) Provisional application No. 62/899,596, filed on Sep. 12, 2019.

(51) Int. Cl.
*G06F 3/01* (2006.01)
*G06T 19/00* (2011.01)

(52) U.S. Cl.
CPC .............. *G06F 3/014* (2013.01); *G06F 3/016* (2013.01); *G06F 3/017* (2013.01); *G06T 19/006* (2013.01); *G06T 2210/21* (2013.01)

(58) Field of Classification Search
USPC ........................................................ 345/156
See application file for complete search history.

(56) References Cited

U.S. PATENT DOCUMENTS

| | | | |
|---|---|---|---|
| 11,132,058 B1* | 9/2021 | Gupta | G06T 19/006 |
| 2006/0277571 A1* | 12/2006 | Marks | F41A 33/02 |
| | | | 725/37 |
| 2012/0232780 A1* | 9/2012 | Delson | A63F 13/285 |
| | | | 340/407.1 |
| 2012/0268360 A1* | 10/2012 | Mikhailov | A63F 13/235 |
| | | | 345/156 |
| 2016/0246370 A1* | 8/2016 | Osman | G06F 3/012 |
| 2016/0274662 A1* | 9/2016 | Rimon | G06F 3/16 |
| 2018/0161671 A1* | 6/2018 | Heubel | A63F 13/212 |
| 2018/0232050 A1* | 8/2018 | Ofek | G06T 3/18 |
| 2019/0391647 A1* | 12/2019 | Rihn | G06F 3/017 |
| 2020/0117212 A1* | 4/2020 | Tian | G01C 21/206 |

* cited by examiner

*Primary Examiner* — Chineyere D Wills-Burns
(74) *Attorney, Agent, or Firm* — Greenberg Traurig, LLP

(57) ABSTRACT

The disclosed system may include (1) a processor that generates an artificial environment that includes a virtual object, (2) a display that presents the artificial environment, (3) an input subsystem that detects tracks positioning of a body, and (4) a plurality of haptic actuators that are arranged to apply haptic feedback to a first plurality of locations on the body, where the processor (a) determines, based on the positioning of the body, a virtual contact of one of a second plurality of locations on the body with the virtual object, where the second plurality of locations is different from the first plurality of locations, and (b) activates, in response to the virtual contact, at least one of the plurality of haptic actuators based on a mapping of the second plurality of locations to the plurality of haptic actuators. Various other systems and methods are also disclosed.

20 Claims, 11 Drawing Sheets

Virtual Keyboard Example (Pre-Hover)
500

Virtual Keyboard Example (Hover)
501

Virtual Keyboard Example (Collision)
600

Virtual Keyboard Example (Keypress)
601

SPATIALLY OFFSET HAPTIC FEEDBACK

CROSS REFERENCE TO RELATED APPLICATION

This application is a continuation of U.S. application Ser. No. 17/470,564, filed 9 Sep. 2021, which is a continuation of U.S. application Ser. No. 16/847,327, filed 13 Apr. 2020, which claims the benefit of U.S. Provisional Application No. 62/899,596, filed 12 Sep. 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
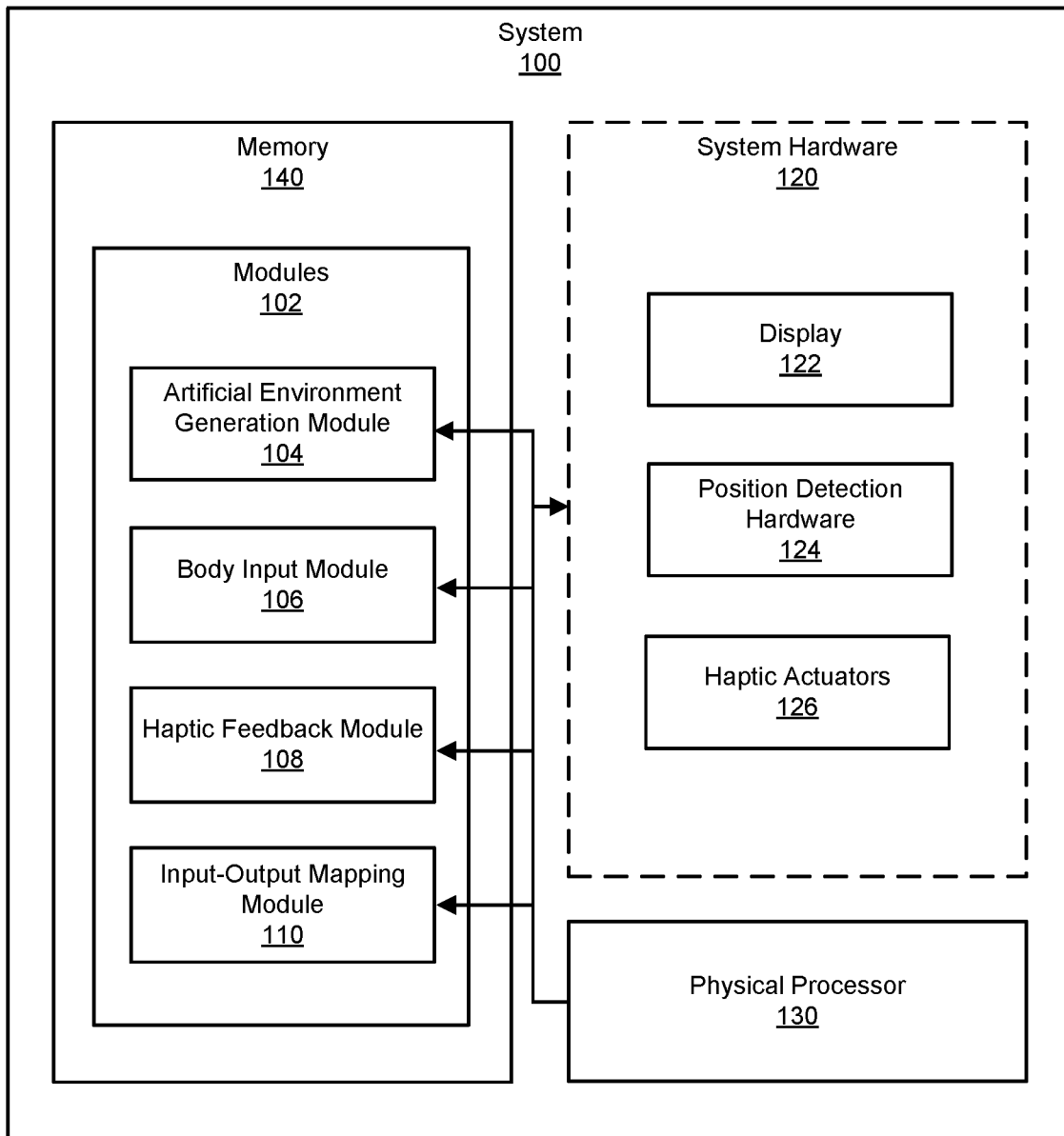
FIG. 1 is a block diagram of an exemplary system (e.g., an artificial-reality system) that employs spatially offset haptic feedback

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Electronic systems (e.g., artificial-reality systems) that interact or interface with a user in some way are increasingly incorporating haptic feedback to provide some level of acknowledgement in response to the user interacting with the systems. In some cases, the haptic feedback provided is in response to user contact with a virtual object being presented in at least a partially artificial environment. For example, in response to a system determining (e.g., by way of detecting a current position of various portions of the user's body, such as by way of a camera) that a user makes contact with a virtual object, the system may provide haptic feedback (e.g., via a haptic actuator) at the point on the user's body at which the virtual contact is made.

The present disclosure is generally directed to spatially offset haptic feedback, in which haptic feedback may be provided at a point on the user's body that is different, or spatially offset, from the point of virtual contact on the user's body. As will be explained in greater detail below, embodiments of the present disclosure may deploy a plurality of haptic actuators that are arranged to apply haptic feedback to a first plurality of locations on the body and employ a mapping of a second plurality of locations on the body (e.g., that are different from the first plurality of locations) to the plurality of haptic actuators. Further, in some examples, in response to determining a virtual contact of one of the second plurality of locations with a virtual object, at least one of the haptic actuators may be activated based on the mapping. In some embodiments, such a system may provide haptic feedback supplied by a relatively few haptic actuators while providing effective feedback to the user.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-11, detailed descriptions of systems and methods that may provide spatially offset haptic feedback. More specifically, an exemplary system (e.g., an artificial-reality system) that provides spatially offset haptic feedback is described in connection with FIG. 1, and a method of providing such feedback is discussed in relation to FIG. 2. In conjunction with FIGS. 3 and 4, exemplary haptic gloves and associated wristbands that may provide spatially offset haptic feedback are described. Use of spatially offset haptic feedback with respect to an exemplary virtual keyboard is explained in connection with FIGS. 5 and 6. Exemplary augmented-reality glasses and an exemplary virtual-reality headset that may be employed in conjunction with spatially offset haptic feedback are described in connection with FIGS. 7 and 8, respectively. Exemplary haptic devices that may be employed with the spatially offset haptic feedback embodiments described herein are discussed in conjunction with FIG. 9. Exemplary haptic feedback subsystems associated with an exemplary virtual-reality environment and an exemplary augmented-reality environment that may incorporate spatially offset haptic feedback are discussed in relation to FIGS. 10 and 11, respectively.

FIG. 1 is a block diagram of an exemplary system (e.g., an artificial-reality system, such as a virtual-reality or augmented-reality system) that may incorporate spatially offset haptic feedback. Portions of system 100, in some embodiments, may be entirely incorporated into a head-mounted device, headset, or similar component, while in other examples, one or more portions of system 100 may be resident in a system or facility external to such a device. As illustrated in FIG. 1, system 100 may include one or more modules 102 for performing one or more tasks. As will be explained in greater detail below, modules 102 may include an artificial environment generation module 104, a body input module 106, a haptic feedback module 108, and an input-output mapping module 110.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices. One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions.

As also depicted in FIG. 1, exemplary system 100 may further include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to provide spatially offset haptic feedback to a user of system 100 in response to virtual contact of the user of system 100 with a virtual object presented in an artificial environment.

As illustrated in FIG. 1, exemplary system 100 may also include one or more system hardware 120 components, such as a display 122, position detection hardware 124, and haptic actuators 126. In some embodiments, display 122 may present (e.g., visually) an artificial environment for the viewer, where the environment includes at least one virtual object. Position detection hardware 124, in some examples, may detect positions of a plurality of portions of the body of the user (e.g., head, fingers, hands, arms, and so on), such by way of one or more cameras, inertial measurement units (IMUs), or the like. Haptic actuators 126 may be arranged or positioned to provide haptic feedback over a plurality of locations on the body of the user. Examples of haptic actuators may include, but are not limited to, linear resonant actuators (LRAs), fluidic haptics, eccentric rotating masses (ERMs), piezoelectric actuators, and the like.

Returning to modules 102, artificial environment generation module 104 may generate an artificial environment for presentation to the user of system 100. More specifically, in at least some embodiments, artificial environment generation module 104 may produce image data for display 122 to present to the user. To generate the image data, artificial environment generation module 104 may receive data from position detection hardware 124 that indicates a location and/or orientation of the user's head to determine the user's field of view of the artificial environment. In some examples, artificial environment generation module 104 may also generate audio data and present that data (e.g., via one or more audio speakers) to the user in conjunction with the image data.

In some embodiments, the body input module 106 may use positions of the various body portions of the user, as detected via position detection hardware 124, to determine if any locations on the body of the user are making contact with a virtual object of the artificial environment (e.g., as displayed to the user via display 122). In some examples, the virtual object may be an object (e.g., a virtual ball, a virtual weapon, and the like) that a user may manipulate within the context of a game or other simulation. In other embodiments, the virtual object may be a virtual device particularly configured to receive user input (e.g., a virtual keyboard). Examples of user interaction and corresponding haptic feedback associated with a virtual keyboard are discussed in greater detail below in connection with FIGS. 5 and 6.

Input-output mapping module 110, in some embodiments, may map a plurality of body locations (e.g., possible locations of the user's body at which a virtual contact may occur) to the plurality of haptic actuators 126. In at least some examples, at least some of these body locations are different from the plurality of locations on the body to which the haptic actuators 126 apply haptic feedback. As discussed in greater detail below with respect to FIGS. 3 and 4, the mapping from the plurality of locations of possible virtual contact to the haptic actuators may take a number of forms. For example, each such location may be mapped to a corresponding one of the haptic actuators in a one-to-one mapping. In other cases, multiple such body locations may be mapped to the same haptic actuator in a multiple-to-one mapping. Also, in some embodiments, one or more such locations may be mapped to multiple haptic actuators. For example, a body location may be mapped to two or more different haptic actuators using a corresponding level of haptic feedback for each actuator. Further, the difference in haptic feedback level between the actuators may be based on an interpolation of a distance between a body location of a virtual contact and each of the actuators such that a shorter distance may result in a greater level of haptic feedback being applied by the associated actuator. Other types of mapping between the possible virtual contact locations on the body and the haptic actuators are also possible in other embodiments.

In some examples, input-output mapping module 110 may employ or include one or more tables or other data structures relating each potential virtual contact location to one or more haptic actuators, possibly along with some indication of a distance or one or more levels of feedback to be applied by the haptic actuator.

Figure 2:
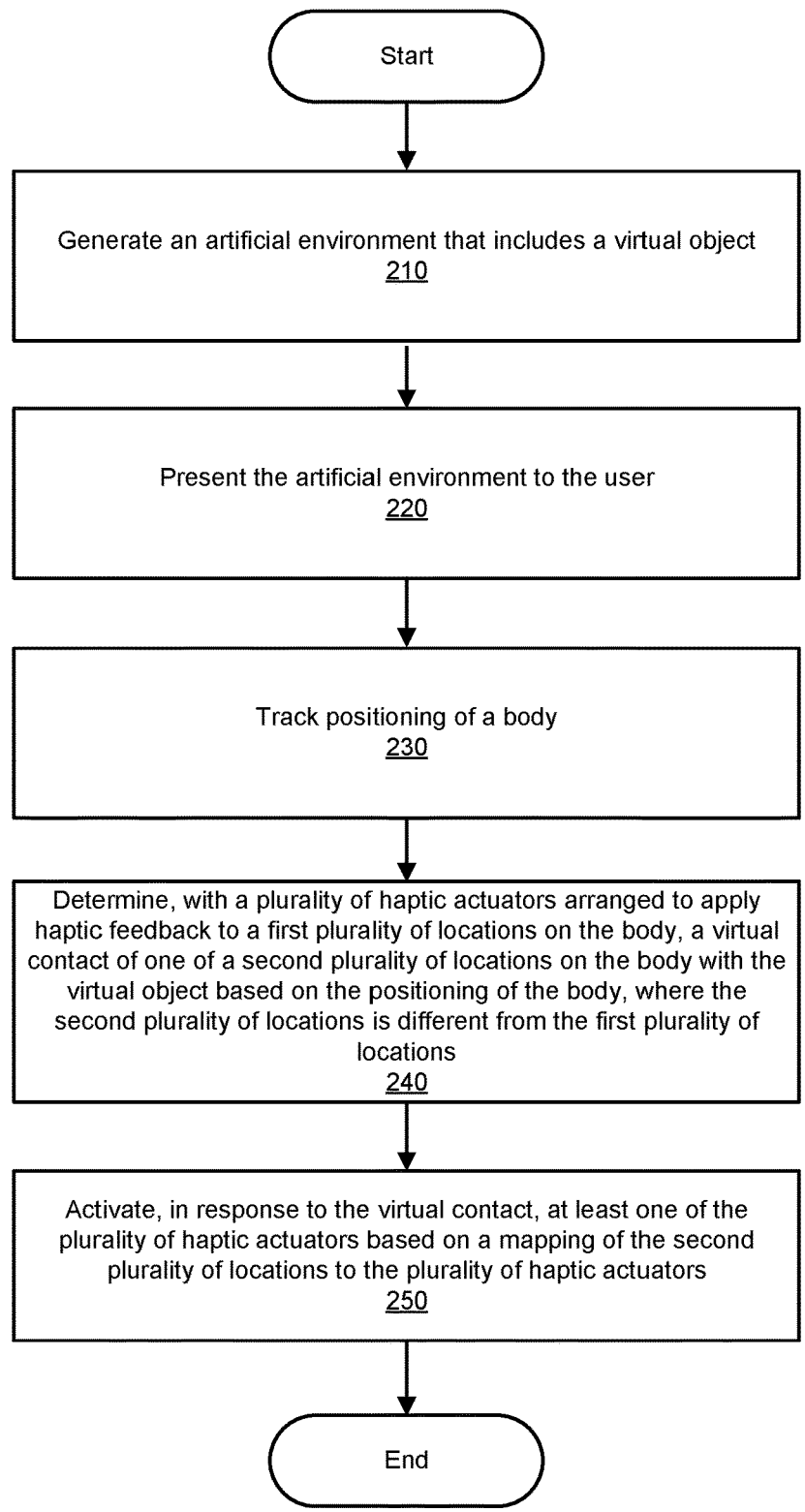
FIG. 2 is a flow diagram of an exemplary method for presenting an artificial environment that includes spatially offset haptic feedback.

FIG. 2 is a flow diagram of an exemplary method 200 (e.g., a computer-implemented method) for providing spatially offset haptic feedback. The steps shown in FIG. 2 may be performed by any suitable computer-executable code and/or computing system, including, but not limited to, system 100 illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, one or more of the systems described herein may generate an artificial environment (e.g., by artificial environment generation module 104) that includes a virtual object. At step 220, the artificial environment may be presented to the user (e.g., using display 122). At step 230, positioning of a body of the user may be tracked (e.g., using position detection hardware 124). At step 240, with a plurality of haptic actuators arranged to apply haptic feedback to a first plurality of locations, a virtual contact of one of a second plurality of second locations that are different from the first plurality of locations with the virtual object may be determined (e.g., by body input module 106) based on the positioning of the body. At step 250, in response to the virtual contact, at least one of the plurality of haptic actuators (e.g., haptic actuators 126) may be activated (e.g., by haptic feedback module 108) based on a mapping of a second plurality of body locations to the plurality of haptic actuators (e.g., by input-output mapping module 110).

Figure 3:
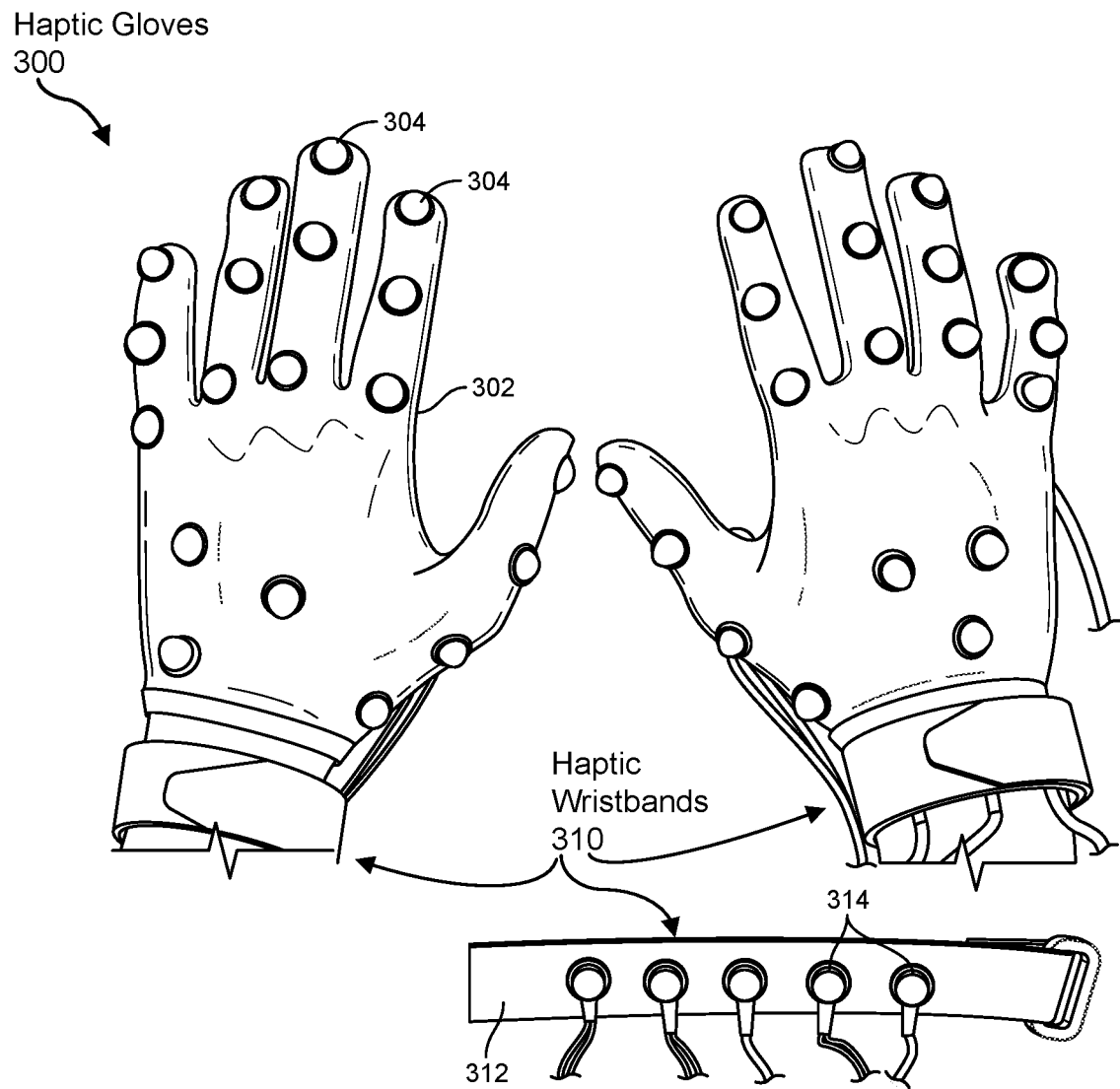
FIGS. 3 and 4 include views of exemplary haptic gloves and associated haptic wristbands that may provide spatially offset haptic feedback.
Figure 4:
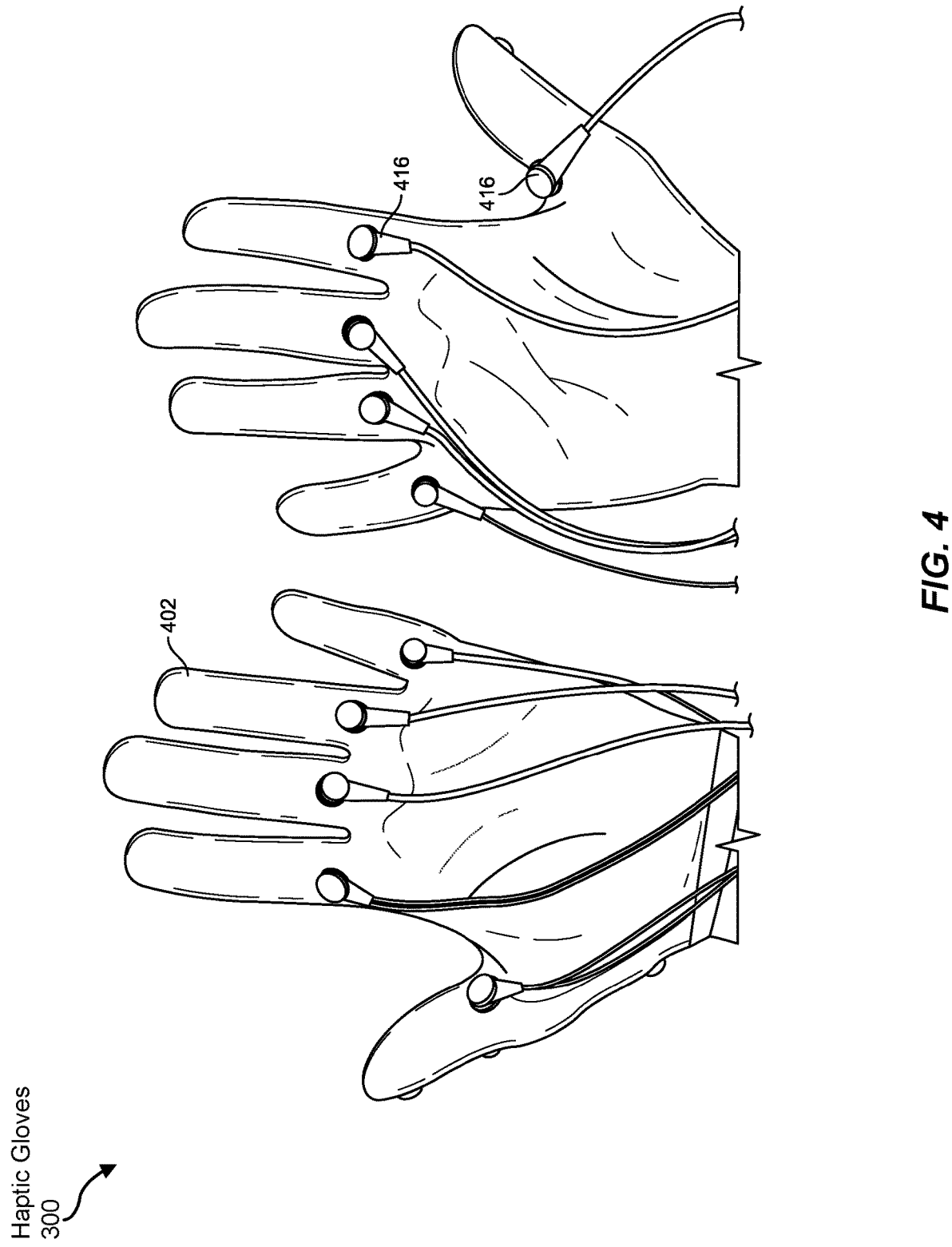

FIGS. 3 and 4 include views of exemplary haptic gloves 300 and associated haptic wristbands 310 that may provide spatially offset haptic feedback. More specifically, FIG. 3 illustrates a top side of the user's hands wearing haptic gloves 300 and haptic wristbands 310, while FIG. 4 depicts an opposite (palm-side or underside) of the hands wearing haptic glove 300. In some embodiments, haptic gloves 300 may carry or incorporate multiple light sources 304 (e.g., light-emitting diodes (LEDs)) to facilitate detection (e.g., by a camera) of the current position of the user's hands and individual fingers. While light sources 304 are illustrated as being distributed along a top side of the user's hand and fingers, additional or alternative placements for light sources 304 (e.g., along the opposite side of the fingers and/or the palm of the hand) are also possible. In yet other examples, other types of position detection technology may be used.

Particularly in reference to FIG. 3, haptic wristbands 310 may include a strap 312 carrying or incorporating one or more haptic actuators 314. In the particular example of FIG. 4, haptic wristbands 310 may be positioned on the wrists of the user such that haptic actuators 314 are aligned along a top side of the wrist. In other examples, each haptic wristband 310 may be aligned along an underside of the corresponding wrist (e.g., the side of the wrist depicted in FIG. 4). While FIG. 4 depicts the use of five haptic actuators 314, one per finger of the associated hand, greater or fewer numbers of haptic actuators 314 may be deployed on a single haptic wristband 310 in other embodiments.

As depicted in FIG. 4, each haptic glove 300 may carry or incorporate one or more haptic actuators 416 on the palm-side of the hands. In the particular example of FIG. 4, each haptic actuator 416 at the base of a corresponding finger (e.g., on a metacarpal adjacent the corresponding finger). In other examples, fewer or greater numbers of haptic actuators 416 may be positioned on the palm side of haptic gloves 300.

Additionally or alternatively, in yet other examples not illustrated in FIGS. 3 and 4, one or more haptic actuators may be configured to apply haptic feedback to other portions (e.g., forearms, elbows, upper arms, etc.) of the body of the user.

In some embodiments, one or more of haptic actuators 314 and 416 may be activated in response to a determination that a body location of the user (e.g., a fingertip) is making virtual contact with a virtual object (e.g., a key of a keyboard). More specifically, with respect to FIGS. 3 and 4, in response to contact by a fingertip with a virtual object, a corresponding one of haptic actuators 314 and/or 416 may be activated. For example, if the end of the thumb makes contact with a virtual object, haptic actuator 314 of 416 nearest that thumb may be activated. Such activation may be based on a one-to-one mapping of each fingertip to a corresponding haptic actuator 314 or 416. Other mappings between fingertips and haptic actuators 314 and/or 416, as cited above, are also possible.

Figure 5:
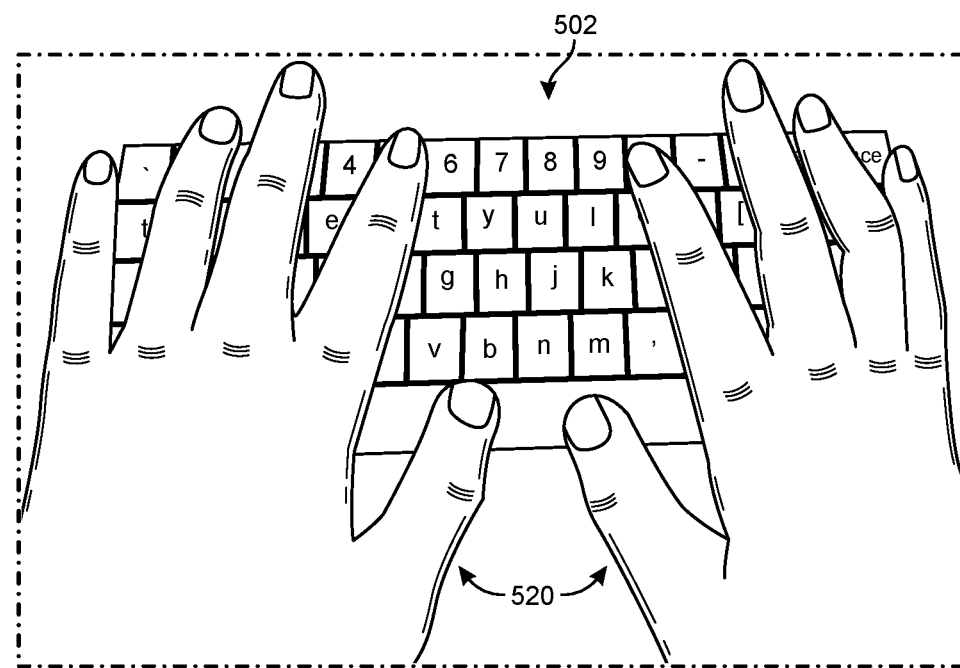
FIGS. 5 and 6 include views of an exemplary virtual keyboard with which a user may interact while experiencing spatially offset haptic feedback.
Figure 5:
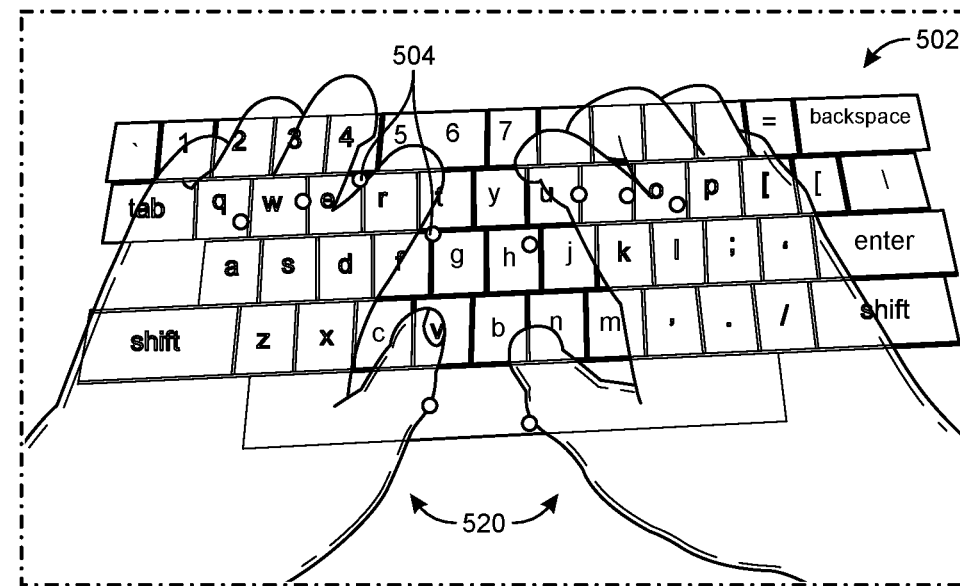
Figure 6:
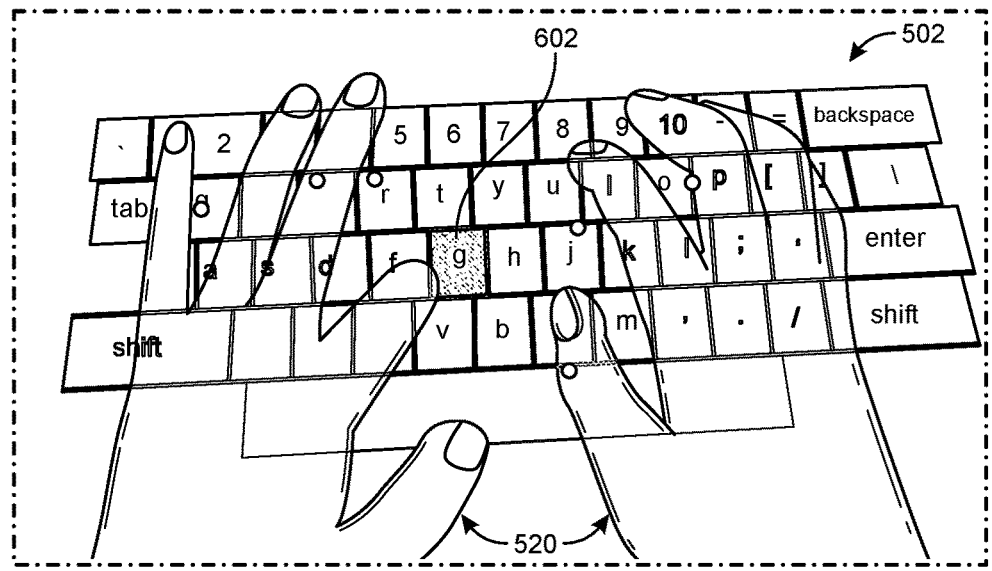
Figure 6:
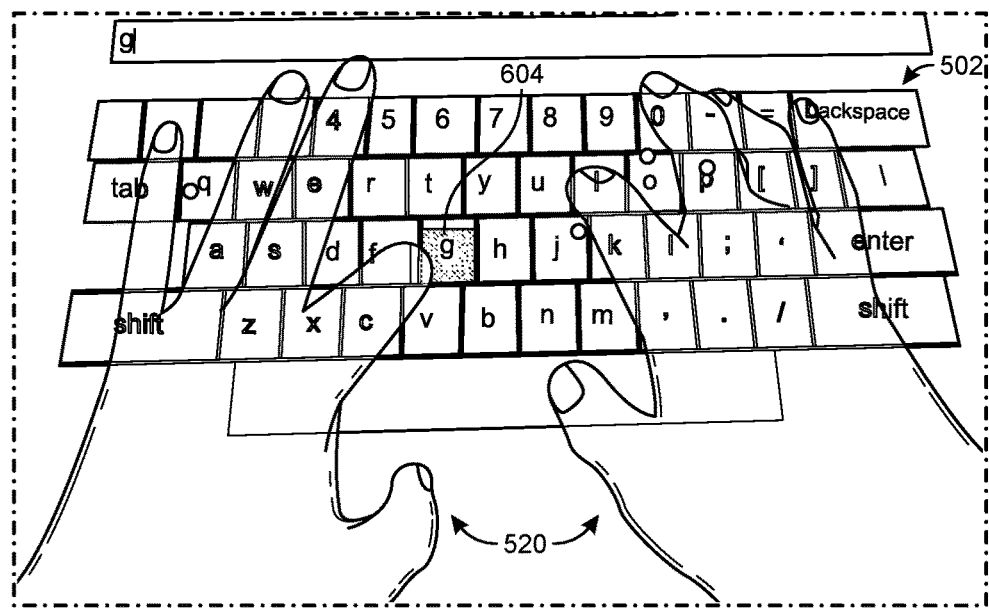

FIGS. 5 and 6 include views of an exemplary virtual keyboard 502 with which a user may interact while experiencing spatially offset haptic feedback. More specifically, each progressive example presented in FIGS. 5 and 6 reflects an increasing level of engagement of a user's hands with keyboard 502. For example, virtual keyboard example 500 of FIG. 5 shows virtual hands 520 at least partially obscuring keyboard 502 as virtual hands 520 are moved toward keyboard 502 to a "pre-hover" position from the perspective of the user. As described above, the position of virtual hands 520 may be based on detection of the current locations of the user's hands and fingers (e.g., by body input module 106 using position detection hardware 124). In other examples, virtual hands 520 may fully obscure portions of virtual keyboard 502, as we would be the case in a real-world environment.

In virtual keyboard example 501 of FIG. 5, based on the continued detected location of the user's hands and fingers, virtual hands 520 are placed more closely over virtual keyboard 502 to a "hover" position. In response, in some embodiments, a hover indicator 504 may be displayed on the surface of virtual keyboard 502 for each finger of the user's virtual hands 520 that is located over virtual keyboard 502. In some examples, hover indicators 504 may provide a visual cue of the position of the user's fingers relative to the keys of virtual keyboard 502. Additionally or alternatively, virtual hands 520 may appear more transparent as virtual hands 520 approach virtual keyboard 502 to facilitate viewing of the individual keys of virtual keyboard 502.

Proceeding to FIG. 6, a virtual keyboard example 600 in which an index finger of one of virtual hands 520 makes an initial contact, touch, or "collision" with a key 602 of virtual keyboard 502 is depicted. In some embodiments, a visual appearance (e.g., color, contrast, etc.) of touched key 602 may be altered to emphasize which key 602 is currently being touched by the index finger of virtual hand 520. Additionally or alternatively, in other examples, the appearance of the finger making contact may be altered in some way to signify the contact. Further, as described above, a haptic system (e.g., system 100) may apply spatially offset feedback to a location on the user's body that is different than the fingertip of the index finger to represent the initial contact. Such locations may include, but are not limited to, the finger base region (e.g., the metacarpal adjacent the index finger), the wrist region corresponding to the index finger, a single wrist region for all of the fingertips of a corresponding virtual hand 520, a single forearm region for all of the fingertips of a corresponding virtual hand 520, and so on. In other examples, haptic actuators may provide haptic feedback to body locations (e.g., the neck, the back, the legs, etc.) that are more spatially offset from the body areas (e.g., fingertips) than the body locations (e.g., finger bases and wrists) discussed above.

Also depicted in FIG. 6, a virtual keyboard example 601 illustrates a keypress of touched key 602 of virtual keyboard example 600, resulting in pressed key 604. As depicted, a visual appearance of pressed key 604 may be further distinguished from that of touched key 602, as well as other keys of virtual keyboard 502. Moreover, spatially offset haptic feedback may be applied to a body area of a user that is different from the tip of the index finger that causes pressed key 604, such as a finger base of the index finger, a wrist region corresponding to the index finger, and the like. Moreover, in some embodiments, the haptic feedback associated with pressed key 604 maybe of a different level or magnitude than the haptic feedback associated with touched key 602. In yet other examples, the haptic feedback associated with pressed key 604 may be applied to a different body area (e.g., a wrist region corresponding to the index finger) than that to which the haptic feedback associated with touched key 602 is applied (e.g., a finger base region corresponding to the index finger). Other variations of haptic feedback to distinguish touched key 602 from pressed key 604 may be applied, even though the portion of virtual hand 520 involved (e.g., the fingertip of the index finger) remains the same.

In view of the discussion above in conjunction with FIGS. 1-6, systems and methods of spatially offset haptic feedback may facilitate the use of a simplified configuration of haptic actuators on various locations of the user while providing useful physical feedback for the user, such as when interacting with an artificial environment. In some examples, such as the repeated use of a virtual keyboard or other virtual input device, the user may increase speed and efficiency in the use of the input device, due at least in part to application of the spatially offset haptic feedback as an input acknowledgment mechanism.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
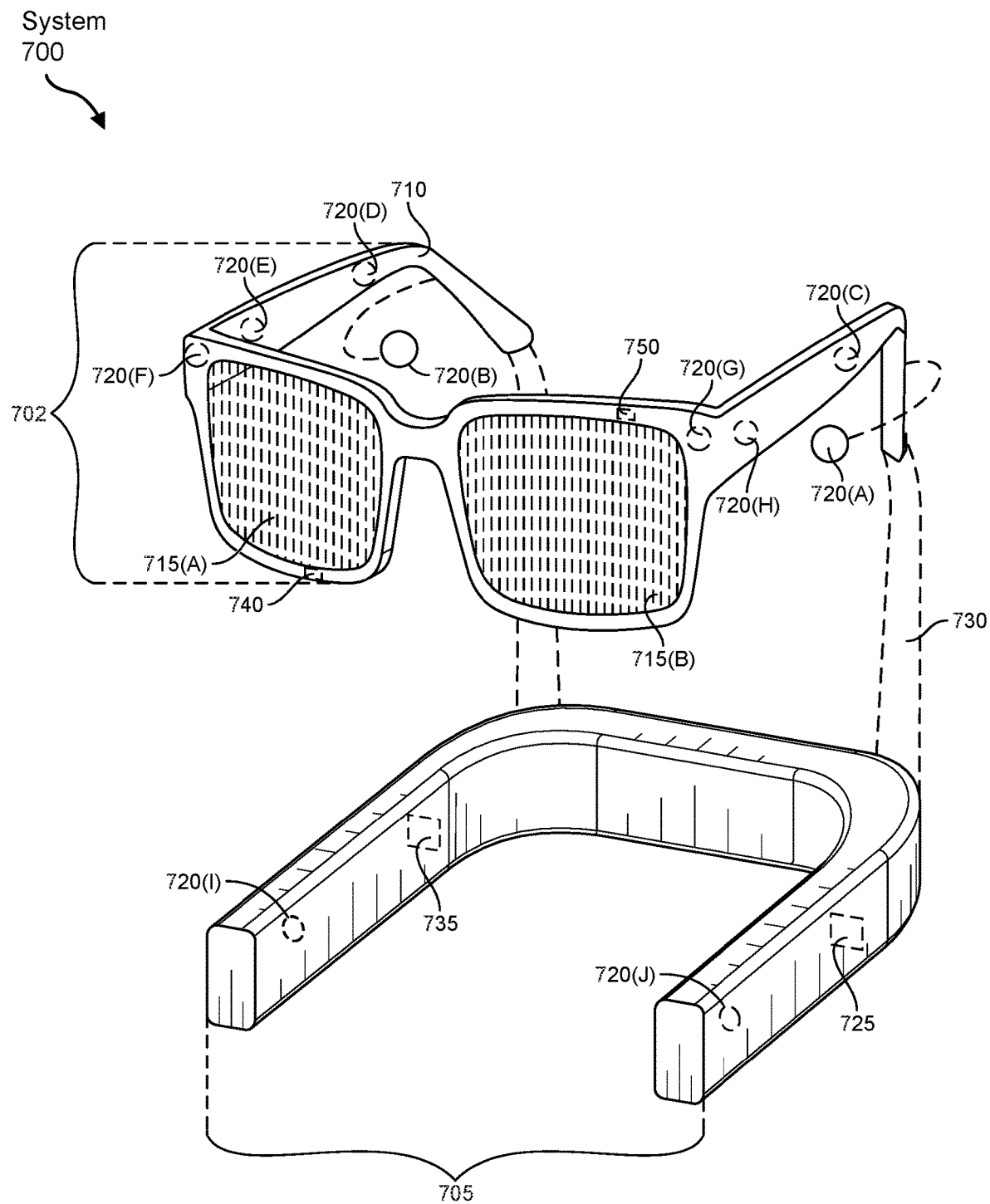
FIG. 7 is an illustration of exemplary augmented-reality glasses that may be used in connection with embodiments of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720(A)-720(J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 8 may include, for example, ten acoustic transducers: 720(A) and 720(B), which may be designed to be placed inside a corresponding ear of the user, acoustic transducers 720(C), 720(D), 720(E), 720(F), 720 (G), and 720(H), which may be positioned at various locations on frame 710, and/or acoustic transducers 720(I) and 720(J), which may be positioned on a corresponding neckband 705.

In some embodiments, one or more of acoustic transducers 720(A)-(F) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality device 700 may simulate binaural hearing and capture a 3D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a Bluetooth connection). In still other embodiments, acoustic transducers 720(A) and 720(B) may not be used at all in conjunction with augmented-reality system 700.

Acoustic transducers 720 on frame 710 may be positioned in a variety of different ways, including along the length of the temples, across the bridge, above or below display devices 715(A) and 715(B), or some combination thereof. Acoustic transducers 720 may also be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(I) and 720(J)) that are part of the microphone array (or potentially form their own microphone subarray). Neckband 705 may also include a controller 725 and a power source 735.

Acoustic transducers 720(I) and 720(J) of neckband 705 may be configured to detect sound and convert the detected sound into an electronic format (analog or digital). In the embodiment of FIG. 7, acoustic transducers 720(I) and 720(J) may be positioned on neckband 705, thereby increasing the distance between the neckband acoustic transducers 720(I) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720 (D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 700 and/or virtual-reality system 800 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 700 and 800 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 9:
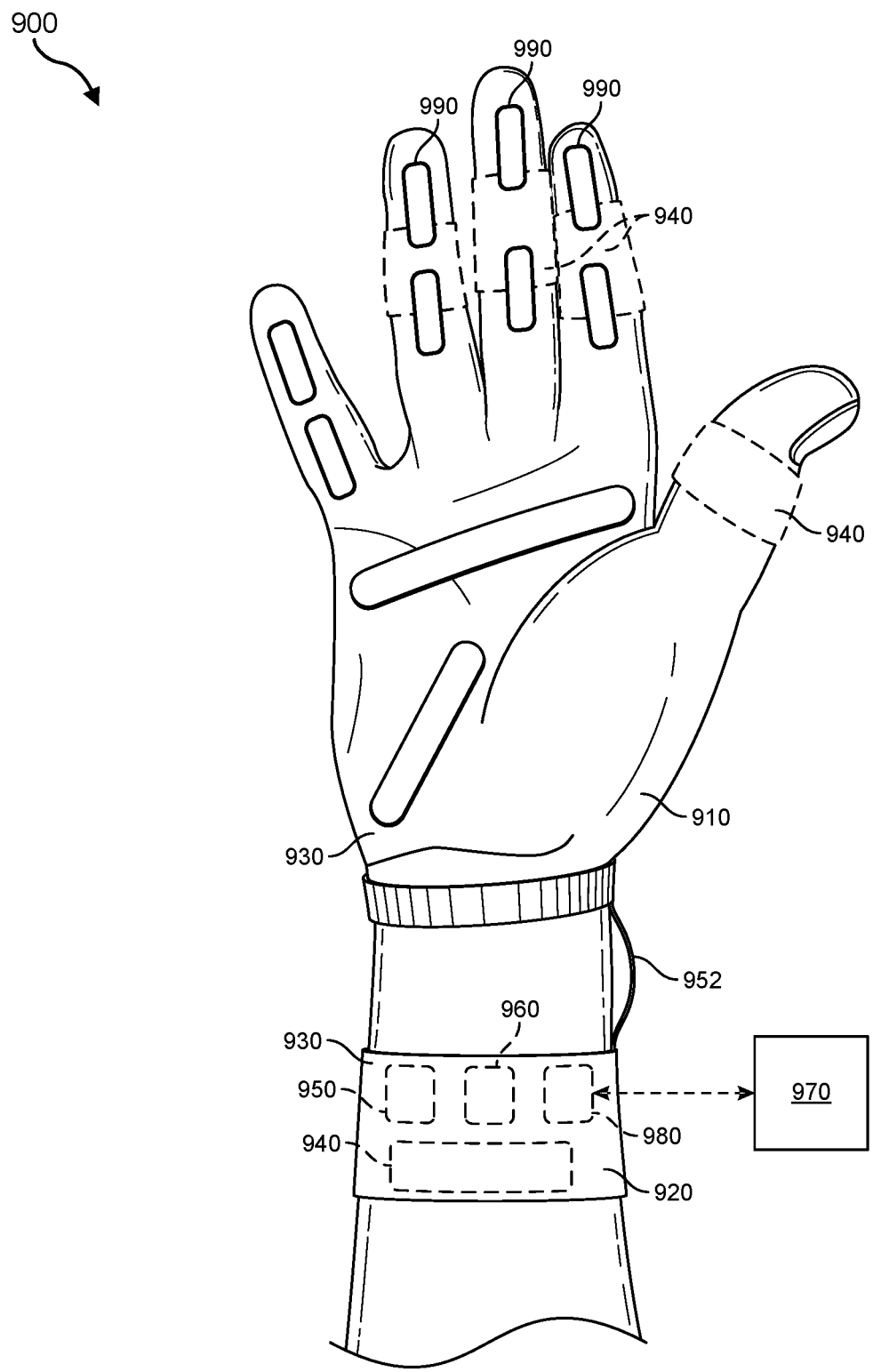
FIG. 9 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 9 illustrates a vibrotactile system 900 in the form of a wearable glove (haptic device 910) and wristband (haptic device 920). Haptic device 910 and haptic device 920 are shown as examples of wearable devices that include a flexible, wearable textile material 930 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 940 may be positioned at least partially within one or more corresponding pockets formed in textile material 930 of vibrotactile system 900. Vibrotactile devices 940 may be positioned in locations to provide a vibrating sensation (e.g., haptic feedback) to a user of vibrotactile system 900. For example, vibrotactile devices 940 may be positioned against the user's finger(s), thumb, or wrist, as shown in FIG. 9. Vibrotactile devices 940 may, in some examples, be sufficiently flexible to conform to or bend with the user's corresponding body part(s).

A power source 950 (e.g., a battery) for applying a voltage to the vibrotactile devices 940 for activation thereof may be electrically coupled to vibrotactile devices 940, such as via conductive wiring 952. In some examples, each of vibrotactile devices 940 may be independently electrically coupled to power source 950 for individual activation. In some embodiments, a processor 960 may be operatively coupled to power source 950 and configured (e.g., programmed) to control activation of vibrotactile devices 940.

Vibrotactile system 900 may be implemented in a variety of ways. In some examples, vibrotactile system 900 may be a standalone system with integral subsystems and components for operation independent of other devices and systems. As another example, vibrotactile system 900 may be configured for interaction with another device or system 970. For example, vibrotactile system 900 may, in some examples, include a communications interface 980 for receiving and/or sending signals to the other device or system 970. The other device or system 970 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 980 may enable communications between vibrotactile system 900 and the other device or system 970 via a wireless (e.g., Wi-Fi, Bluetooth, cellular, radio, etc.) link or a wired link. If present, communications interface 980 may be in communication with processor 960, such as to provide a signal to processor 960 to activate or deactivate one or more of the vibrotactile devices 940.

Vibrotactile system 900 may optionally include other subsystems and components, such as touch-sensitive pads 990, pressure sensors, motion sensors, position sensors, lighting elements, and/or user interface elements (e.g., an on/off button, a vibration control element, etc.). During use, vibrotactile devices 940 may be configured to be activated for a variety of different reasons, such as in response to the user's interaction with user interface elements, a signal from the motion or position sensors, a signal from the touch-sensitive pads 990, a signal from the pressure sensors, a signal from the other device or system 970, etc.

Although power source 950, processor 960, and communications interface 980 are illustrated in FIG. 9 as being positioned in haptic device 920, the present disclosure is not so limited. For example, one or more of power source 950, processor 960, or communications interface 980 may be positioned within haptic device 910 or within another wearable textile.

Figure 10:
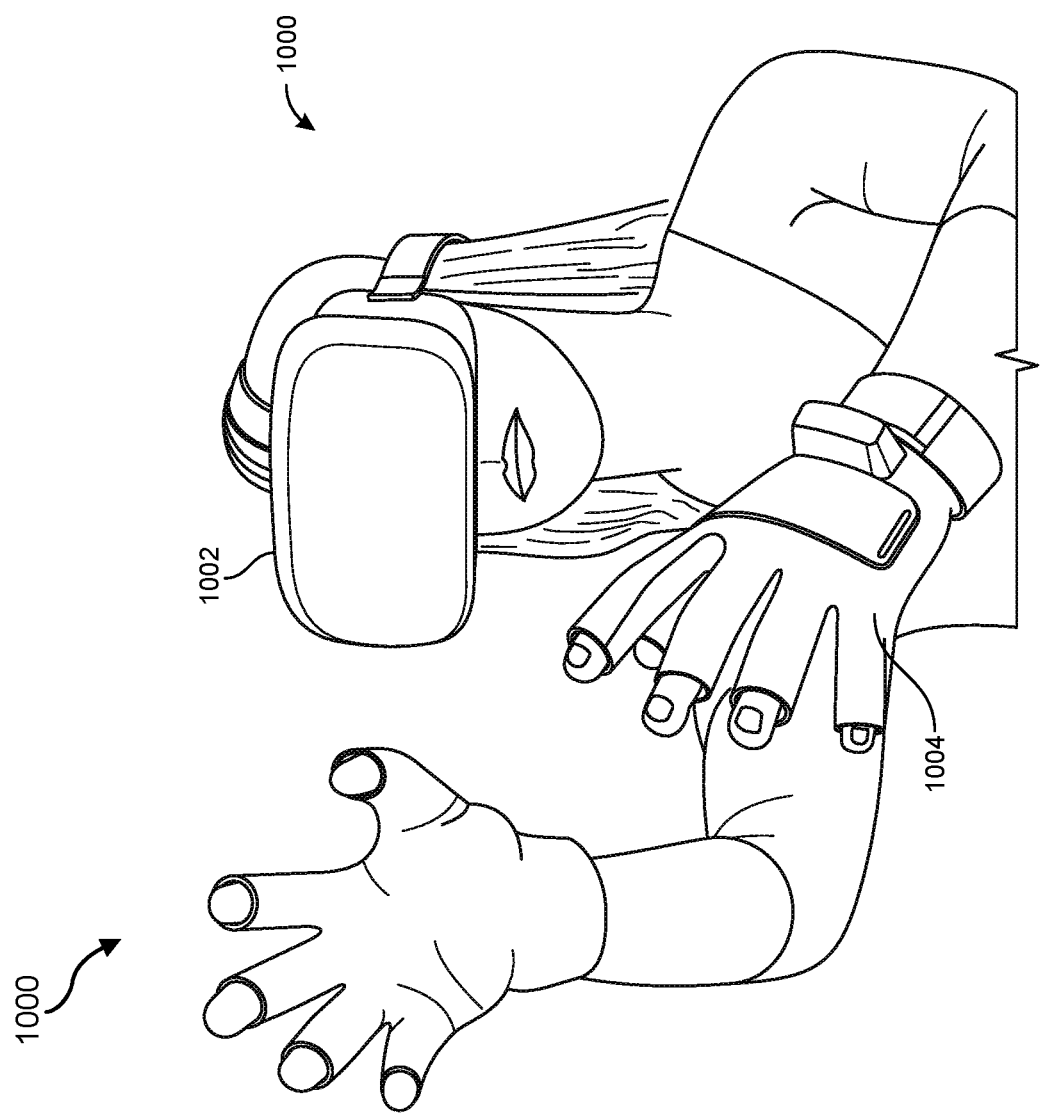
FIG. 10 is an illustration of an exemplary virtual-reality environment according to embodiments of this disclosure.

Haptic wearables, such as those shown in and described in connection with FIG. 9, may be implemented in a variety of types of artificial-reality systems and environments. FIG. 10 shows an example artificial-reality environment 1000 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 8:
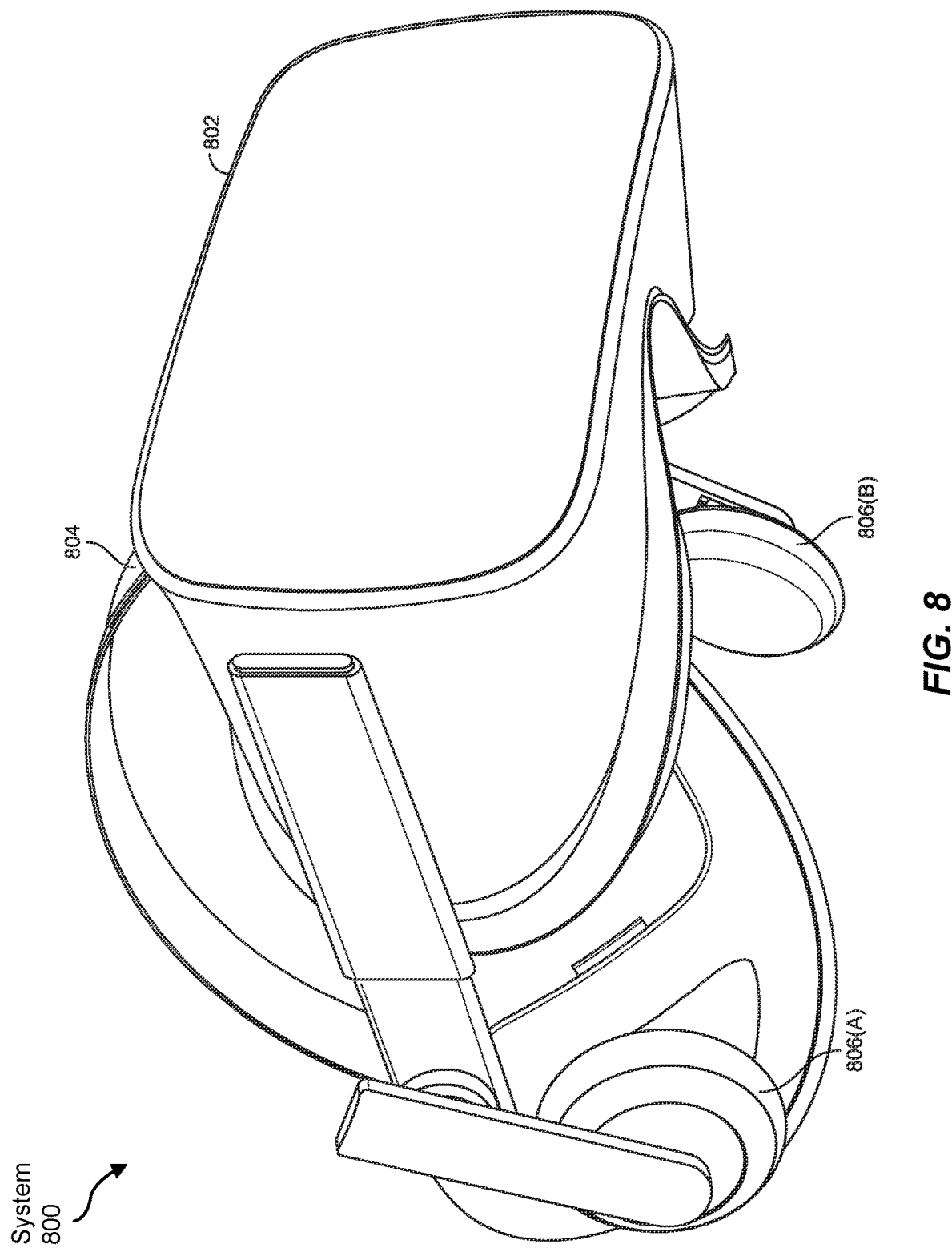
FIG. 8 is an illustration of an exemplary virtual-reality headset that may be used in connection with embodiments of this disclosure.

Head-mounted display 1002 generally represents any type or form of virtual-reality system, such as virtual-reality system 800 in FIG. 8. Haptic device 1004 generally represents any type or form of wearable device, worn by a user of an artificial-reality system, that provides haptic feedback to the user to give the user the perception that he or she is physically engaging with a virtual object. In some embodiments, haptic device 1004 may provide haptic feedback by applying vibration, motion, and/or force to the user. For example, haptic device 1004 may limit or augment a user's movement. To give a specific example, haptic device 1004 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1004 to send action requests to a console. Examples of action requests include, without limitation, requests to start an application and/or end the application and/or requests to perform a particular action within the application.

Figure 11:
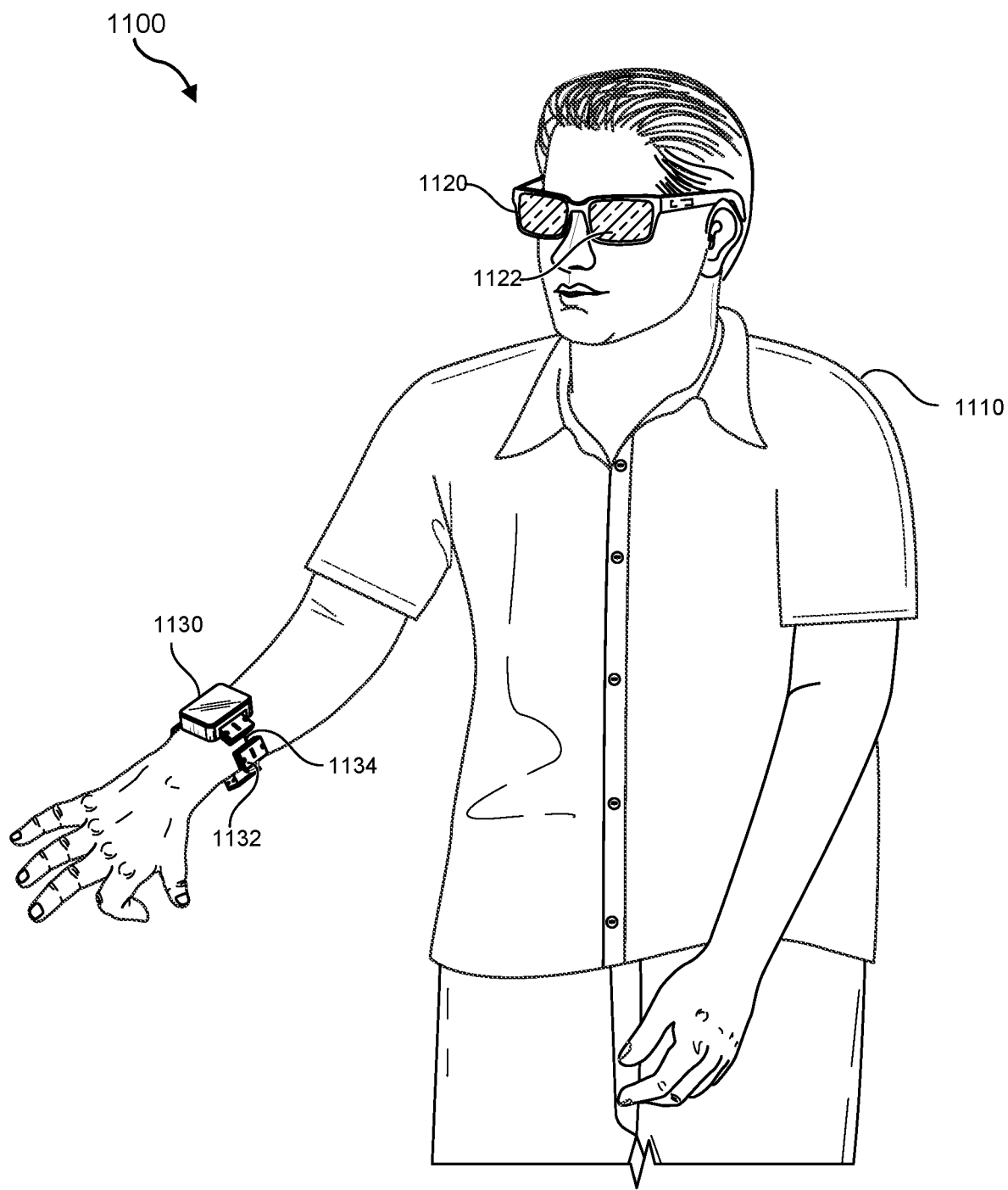
FIG. 11 is an illustration of an exemplary augmented-reality environment according to embodiments of this disclosure.

While haptic interfaces may be used with virtual-reality systems, as shown in FIG. 10, haptic interfaces may also be used with augmented-reality systems, as shown in FIG. 11. FIG. 11 is a perspective view of a user 1110 interacting with an augmented-reality system 1100. In this example, user 1110 may wear a pair of augmented-reality glasses 1120 that may have one or more displays 1122 and that are paired with a haptic device 1130. In this example, haptic device 1130 may be a wristband that includes a plurality of band elements 1132 and a tensioning mechanism 1134 that connects band elements 1132 to one another.

One or more of band elements 1132 may include any type or form of actuator suitable for providing haptic feedback. For example, one or more of band elements 1132 may be configured to provide one or more of various types of cutaneous feedback, including vibration, force, traction, texture, and/or temperature. To provide such feedback, band elements 1132 may include one or more of various types of actuators. In one example, each of band elements 1132 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 910, 920, 1004, and 1130 may include any suitable number and/or type of haptic transducer, sensor, and/or feedback mechanism. For example, haptic devices 910, 920, 1004, and 1130 may include one or more mechanical transducers, piezoelectric transducers, and/or fluidic transducers. Haptic devices 910, 920, 1004, and 1130 may also include various combinations of different types and forms of transducers that work together or independently to enhance a user's artificial-reality experience. In one example, each of band elements 1132 of haptic device 1130 may include a vibrotactor (e.g., a vibrotactile actuator)

configured to vibrate in unison or independently to provide one or more of various types of haptic sensations to a user.

EXAMPLE EMBODIMENTS

Example 1: A system for providing spatially offset haptic feedback may include (1) a processor that generates an artificial environment that includes a virtual object, (2) a display that presents the artificial environment, (3) an input subsystem that tracks positioning of a body, and (4) a plurality of haptic actuators that are arranged to apply haptic feedback to a first plurality of locations on the body, where the processor (a) determines, based on the positioning of the body, a virtual contact of one of a second plurality of locations on the body with the virtual object, where the second plurality of locations is different from the first plurality of locations, and (b) activates, in response to the virtual contact, at least one of the plurality of haptic actuators based on a mapping of the second plurality of locations to the plurality of haptic actuators.

Example 2: The system of Example 1, where the mapping may include a one-to-one mapping of each of the second plurality of locations to a corresponding one of the plurality of haptic actuators.

Example 3: The system of Example 2, where (1) the second plurality of locations may include fingertips of a hand and (2) for each of the fingertips, the corresponding one of the plurality of haptic actuators may apply haptic feedback to a metacarpal area corresponding to the fingertip.

Example 4: The system of Example 2, where (1) the second plurality of locations may include fingertips of a hand and (2) for each of the fingertips, the corresponding one of the plurality of haptic actuators may apply haptic feedback to a wrist area corresponding to the fingertip.

Example 5: The system of Example 2, where (1) the second plurality of locations may include fingertips of a hand and (2) for each of the fingertips, the corresponding one of the plurality of haptic actuators may apply haptic feedback to a forearm area corresponding to the fingertip.

Example 6: The system of either Example 1 or Example 2, where the mapping may include at least one mapping of multiple ones of the second plurality of locations to one of the plurality of haptic actuators.

Example 7: The system of Example 6, where (1) the multiple ones of the second plurality of locations may include fingertips of a hand and (2) the one of the plurality of haptic actuators may apply haptic feedback to a metacarpal area.

Example 8: The system of Example 6, where (1) the multiple ones of the second plurality of locations may include fingertips of a hand and (2) the one of the plurality of haptic actuators may apply haptic feedback to a wrist area.

Example 9: The system of Example 6, where (1) the multiple ones of the second plurality of locations may include fingertips of a hand and (2) the one of the plurality of haptic actuators may apply haptic feedback to a forearm area.

Example 10: The system of either Example 1 or Example 2, where the mapping may map the one of the second plurality of locations to multiple ones of the plurality of haptic actuators.

Example 11: The system of Example 10, where the processor may activate, in response to determining the virtual contact, the multiple ones of the plurality of haptic actuators using at least two different levels of haptic feedback based on an interpolation of a distance between the one of the second plurality of locations and each of at least two of the plurality of haptic actuators.

Example 12: The system of either Example 1 or Example 2, where the display may present, at a representation of the virtual object, a visual indication of the virtual contact.

Example 13: The system of either Example 1 or Example 2, where (1) the processor may further determine a level of the virtual contact at the one of the second plurality of locations and (2) activating the at least one of the plurality of haptic actuators may include causing the at least one of the plurality of haptic actuators to apply a level of haptic feedback corresponding to the level of the virtual contact.

Example 14: The system of Example 13, where the display may present a visual indication of the level of the virtual contact.

Example 15: The system of Example 14, the visual indication may be displayed at a representation of the virtual object.

Example 16: The system of Example 14, where the visual indication may be displayed at a representation of the one of the second plurality of locations.

Example 17: The system of Example 14, where (1) the virtual object may include an input button that provides input to the system and (2) the level of the virtual contact may include one of (a) contact with the input button or (b) activation of the input button.

Example 18: A haptic feedback device may include (1) a wearable article configured to be worn on a body and (2) a plurality of haptic actuators that are supported by, and arranged about, the wearable article to apply haptic feedback to a first plurality of locations on the body that are covered by the wearable article, where each actuator of the plurality of haptic actuators is activated in response to a determined virtual contact of one of a second plurality of locations on the body with a virtual object in an artificial environment based on a mapping of the second plurality of locations to the plurality of haptic actuators.

Example 19: The haptic feedback device of Example 18, where the first plurality of locations may include at least one of (1) one or more metacarpal areas, (2) one or more wrist areas, or (4) one or more forearm areas.

Example 20: A method may include (1) generating, by a processor, an artificial environment that includes a virtual object, (2) presenting, by a display, the artificial environment, (3) tracking, by an input subsystem, positioning of a body, (4) determining, by the processor based on the positioning of the body with a plurality of haptic actuators arranged to apply haptic feedback to a first plurality of locations on the body, a virtual contact of one of a second plurality of locations on the body with the virtual object, where the second plurality of locations is different from the first plurality of locations, and (5) activating, by the processor in response to the virtual contact, at least one of the plurality of haptic actuators based on a mapping of the second plurality of locations to the plurality of haptic actuators.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive body positioning data of a user to be transformed, transform the body positioning data into virtual contact data with a virtual object of an artificial environment, and employ the virtual contact data to activate one or more haptic actuators to provide spatially offset haptic feedback to the body of the user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a sensor that tracks positioning of a user's body;
a first haptic actuator that applies haptic feedback at a first location associated with a first body part;
a second haptic actuator that applies haptic feedback at a second location associated with a second body part, wherein the second body part is different from the first body part; and
a processor configured to:
determine, based on a position of the user's second body part, that a virtual interaction occurred between a representation of the second body part and a virtual object in an artificial environment; and
activate, in response to the virtual interaction, the first haptic actuator based on a mapping of the second body part to the first haptic actuator, the activation providing spatially offset haptic feedback at the first location associated with the first body part.

2. The system of claim 1, wherein the processor is further configured to:
activate, in response to the virtual interaction, the second haptic actuator, the activation providing haptic feedback at the second location associated with the second body part.

3. The system of claim 1, wherein the first body part comprises the user's hand and the second body part comprises the user's head.

4. The system of claim 3, wherein the second actuator is proximate to the user's head and wherein the first actuator is embedded in a handheld controller.

5. The system of claim 4, wherein the second actuator is embedded in an item of headwear worn by the user.

6. The system of claim 5, wherein the headwear comprises an artificial reality (AR) or virtual reality (VR) headset.

7. The system of claim 6, wherein the second haptic actuator comprises a vibrating transducer.

8. The system of claim 7, wherein the vibrating transducer is positioned within the AR or VR headset to align with the user's forehead.

9. The system of claim 4, wherein the handheld controller is configured to operate with an artificial reality (AR) or virtual reality (VR) headset.

10. The system of claim 9, wherein the first haptic actuator comprises a vibrating transducer that is embedded within the handheld controller.

11. The system of claim 10, wherein the vibrating transducer is positioned within a handle portion of the handheld controller.

12. The system of claim 1, wherein the first haptic actuator or the second haptic actuator comprises at least one of a linear resonant actuator (LRAs), a fluidic haptic device, an eccentric rotating mass (ERMs), or a piezoelectric actuator.

13. A method comprising:
   tracking, by a sensor that is part of a feedback system, a position of a user's second body part, the feedback system including a first haptic actuator that applies haptic feedback at a first location associated with a first body part and a second haptic actuator that applies haptic feedback at a second location associated with a second body part, wherein the second body part is different from the first body part;
   determining, by a processor, and based on the position of the user's second body part, that a virtual interaction occurred between a representation of the second body part and a virtual object in an artificial environment; and
   activating, by the processor, in response to the virtual interaction, the first haptic actuator based on a mapping of the second body part to the first haptic actuator, the activation providing spatially offset haptic feedback at the first location associated with the first body part.

14. The method of claim 13, further comprising presenting, at a display, a representation of the interaction with the virtual object within the artificial environment.

15. The method of claim 14, further comprising:
   determining a level of the virtual interaction associated with the representation of the user's second body part and the virtual object; and
   activating the first haptic actuator in a manner where the first haptic actuator applies a level of haptic feedback that corresponds to the determined level of the virtual interaction.

16. The method of claim 15, wherein the display presents a visual indication of the determined level of the virtual interaction.

17. The method of claim 13, further comprising activating, in response to the virtual interaction, the second haptic actuator, the activation providing haptic feedback at the second location associated with the second body part.

18. The method of claim 13, wherein the first body part comprises the user's hand and the second body part comprises the user's head.

19. The method of claim 18, wherein the second actuator is proximate to the user's head and wherein the first actuator is embedded in a handheld controller.

20. An apparatus comprising:
   a sensor that tracks positioning of a user's body;
   a first haptic actuator that applies haptic feedback at a first location associated with a first body part;
   a second haptic actuator that applies haptic feedback at a second location associated with a second body part, wherein the second body part is different from the first body part; and
   a processor configured to:
      determine, based on a position of the user's second body part, that a virtual interaction occurred between a representation of the second body part and a virtual object in an artificial environment; and
      activate, in response to the virtual interaction, the first haptic actuator based on a mapping of the second body part to the first haptic actuator, the activation providing spatially offset haptic feedback at the first location associated with the first body part.

* * * * *